(12) United States Patent
Cortez

(10) Patent No.: US 9,403,424 B2
(45) Date of Patent: Aug. 2, 2016

(54) FOLDABLE STRUCTURES AND VEHICLES INCORPORATING THE SAME

(71) Applicant: Ever Cortez, Jefferson, OR (US)

(72) Inventor: Ever Cortez, Jefferson, OR (US)

( * ) Notice: Subject to any disclaimer, the term of this patent is extended or adjusted under 35 U.S.C. 154(b) by 2 days.

(21) Appl. No.: 14/595,054

(22) Filed: Jan. 12, 2015

(65) Prior Publication Data
US 2015/0197141 A1    Jul. 16, 2015

Related U.S. Application Data

(60) Provisional application No. 61/926,792, filed on Jan. 13, 2014.

(51) Int. Cl.
*B60P 3/00*  (2006.01)
*B60J 7/14*  (2006.01)

(52) U.S. Cl.
CPC ....................... *B60J 7/141* (2013.01)

(58) Field of Classification Search
CPC ................... B60J 7/141; B60R 9/06
See application file for complete search history.

(56) References Cited

U.S. PATENT DOCUMENTS

| | | | |
|---|---|---|---|
| 2,901,286 A | 8/1959 | Harris | |
| 2,997,330 A | 8/1961 | Boultinghouse | |
| 3,995,890 A | 12/1976 | Fletcher | |
| 5,013,078 A | 5/1991 | Eckerd et al. | |
| 6,224,140 B1 | 5/2001 | Hoplock | |
| 6,598,930 B1 | 7/2003 | Tilton | |
| 6,712,422 B1 * | 3/2004 | Vaillancourt | B60P 3/341 296/164 |
| 7,118,159 B1 | 10/2006 | Andrews | |
| 7,246,839 B1 * | 7/2007 | Nyberg | B60J 7/11 296/100.01 |
| 7,419,201 B2 | 9/2008 | Hanson | |
| 7,527,318 B2 | 5/2009 | Geise | |
| 7,735,898 B1 | 6/2010 | Bridges | |
| 2003/0047958 A1 * | 3/2003 | Yarbrough | B60J 7/1621 296/100.06 |
| 2004/0036308 A1 * | 2/2004 | Sloss | B60P 3/40 296/3 |
| 2009/0026784 A1 | 1/2009 | Green | |
| 2009/0200820 A1 | 8/2009 | Smith, Jr. | |

OTHER PUBLICATIONS

ARB® ARB101US—Simpson III Rooftop Tent from CarID website—http://www.carid.com/universal-roof-racks/arb-roof-racks-12919794.html, downloaded on Oct. 25, 2013.
Roof Top Tents from Bigfoot Tents website—http://www.bigfoot-tents.com/, downloaded on Oct. 25, 2013.

(Continued)

*Primary Examiner* — Lori L Lyjak
(74) *Attorney, Agent, or Firm* — Dascenzo Intellectual Property Law, PC

(57) ABSTRACT

Convertible racks and vehicles incorporating convertible racks are disclosed. The convertible rack is adapted to form a flat conformation (e.g., like a tonneau cover), a rack conformation (e.g., like a truck rack), and a covered conformation (e.g., like a truck bed tent). The convertible rack includes a left foldable assembly and a right foldable assembly. Each of the foldable assemblies include a rack section and a roof section. When in the flat conformation and rack conformations, the roof sections are folded onto the corresponding rack sections. In the flat conformation, the rack sections are generally positioned horizontal. In the rack conformation, the rack sections are generally positioned vertical. In the covered conformation, the roof sections are folded away from the rack sections and opposite side roof sections may be selectively coupled together.

20 Claims, 7 Drawing Sheets

(56) References Cited

OTHER PUBLICATIONS

Challenge Winner: Create Your Own PVC Shower Rack from Life Hacker website—http://lifehacker.com/tag/hacker-challenge-winner-create-your-own-pvc-shower-rac-642642997, downloaded on Oct. 25, 2013.

Rightline CampRight Truck Bed Tent from eTrailer.com website—http://www.etrailer.com/Truck-Bed-Tents/Rightline-Gear/RL110865.html, downloaded on Oct. 25, 2013.

Soft Topper Retractable Camper Top Cap from Tents on Trucks & Accessories website—http://www.tentsontrucks.com/soft_topper_camper_top_cap.html, downloaded on Oct. 25, 2013.

* cited by examiner

FOLDABLE STRUCTURES AND VEHICLES INCORPORATING THE SAME

FIELD

The present disclosure relates to foldable structures and vehicles incorporating the same.

BACKGROUND

A pickup truck is a light motor vehicle with an open-top, rear cargo area called a bed. The bed is generally open, configured for versatility, and includes a short box formed of four walls that surround the base of the bed. However, for greater versatility, one might install a truck rack to carry cargo above the bed. A truck rack may be adapted to carry large materials and equipment, with examples including building materials, lumber, pipes, ladders, and boats. Truck racks are coupled to the truck bed, typically at the top of the bed rails.

Trucks may include a tonneau cover to cover and secure the box of the truck. Tonneau covers are hard or soft coverings that extend horizontally across the top of the box, typically spanning the entire space between the top of the walls of the box. Tonneau covers may be rigid structures that effectively turn the box into a large trunk. Such configurations typically open from the rear of the truck and are supported by gas struts due to the weight of the cover.

Further, trucks may include a truck cap, sometimes called a truck canopy or a truck shell. Similar to tonneau covers, truck caps cover the bed of the truck. However, truck caps generally are configured to enclose a space above the box of the truck and commonly are designed to form an exterior that is the same height as the cab of the truck. Truck caps typically are rigid structures coupled to the top of the box and may include a rear door above the rear of the box (e.g., above the tailgate of the truck).

Trucks also may accommodate a truck bed tent, a tent configured to provide a temporary living space within the bed of the truck. Truck bed tents use the bed of the truck as the floor of the tent (though some truck bed tents may include a fabric liner over the truck bed) and enclose a vertical space generally above the truck bed. Other than being configured to fit the bed of a truck, truck bed tents are similar to ordinary tents for camping. Unlike truck racks, tonneau covers, and truck caps, truck bed tents are not configured for use or deployment while the truck is in motion.

Though each of a truck rack, a tonneau cover, a truck cap, and a truck bed tent add versatility to a truck, none are adapted to provide open rack space, concealed trunk space, enclosed cargo space, and/or living space at the discretion of the operator.

SUMMARY

Convertible racks and vehicles incorporating convertible racks are disclosed. The convertible rack is adapted to form a flat conformation (e.g., like a tonneau cover), a rack conformation (e.g., like a truck rack), and a covered conformation (e.g., like a truck bed tent). The convertible rack includes a left foldable assembly and a right foldable assembly. Each of the foldable assemblies include a rack section and a roof section. When in the flat conformation and rack conformations, the roof sections are folded onto the corresponding rack sections. In the flat conformation, the rack sections are generally positioned horizontal. In the rack conformation, the rack sections are generally positioned vertical. In the covered conformation, the roof sections are folded away from the rack sections and opposite side roof sections may be selectively coupled together.

DESCRIPTION

Figure 1:
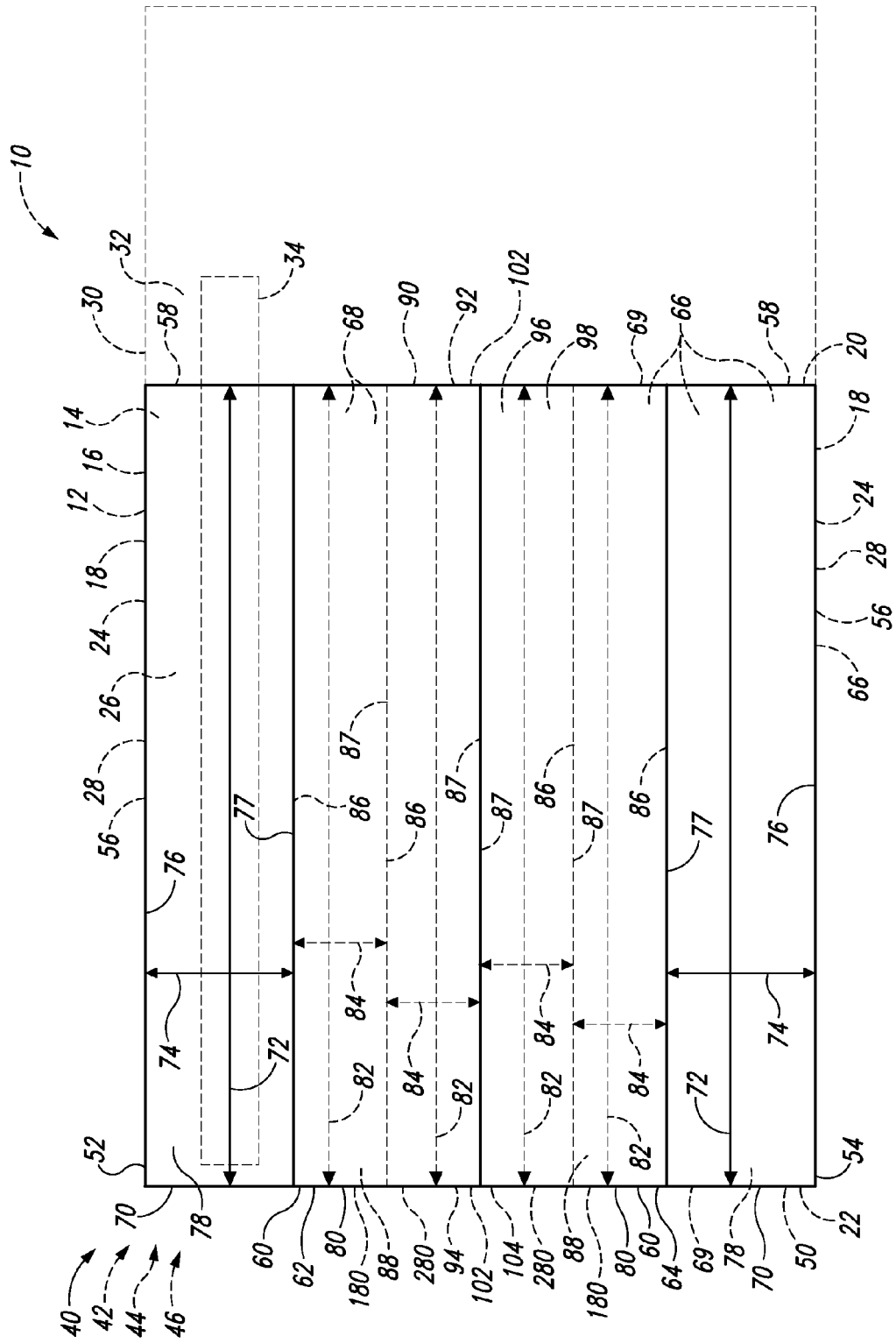
FIG. 1 is a schematic representation of vehicles and foldable structures approximately corresponding to a top view.

FIGS. 1-7 illustrate vehicles 10 (which may also be referred to as trucks 10) including foldable structures 40 and elements thereof according to the present disclosure. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled in each of the figures, but reference numerals associated therewith may be used for consistency. Elements, components, and/or features that are discussed with reference to one of the figures may be included in and/or used with any of the elements, components, and/or features of another figure without departing from the scope of the present disclosure. In general, elements that are likely to be included are illustrated in solid lines, while elements that may be optional or alternatives are illustrated in dashed lines. However, elements that are shown in solid lines are not necessarily essential, and an element shown in solid lines may be omitted without departing from the scope of the present disclosure.

As schematically illustrated in FIG. 1, vehicles 10 may include a foldable structure 40 (also referred to as a convertible truck rack 40) which comprises a base frame 50 and at least two foldable assemblies 60 (at least a left foldable assembly 62 and a right foldable assembly 64). The base frame includes a left side 52 and a right side 54, and may be adapted to couple to the truck bed 12 of the vehicle (e.g., the truck). The foldable assemblies include a rack section 70 and a roof section 80 flexibly coupled together. For convenience, the rack section and the roof section of the left foldable assembly may be referred to as the left rack section and the left roof section, respectively; the rack section and the roof section of the right foldable assembly may be referred to as the right rack section and the right roof section, respectively. Each rack section is repositionably coupled to the base frame, e.g., the left rack section is repositionably coupled to the left side of the base frame and the right rack section is repositionably coupled to the right side of the base frame. Further, the foldable structure may be adapted to form and/or to transition between a flat conformation 42 (as viewed in FIG. 2), a rack conformation 44 (as viewed in FIG. 3), and a covered conformation 46 (as viewed in FIG. 4).

Throughout this disclosure, general reference to top, bottom, front, back, left, right, forward, backward, above, and below are references to those directions with respect to the vehicle 10 in its normal, operational position (generally with wheels on the ground) and the foldable structure 40 as it would be assembled on the vehicle 10. Left and right also refer to the left and right of a driver of the vehicle. Hence, in the U.S., the driver's side of the vehicle is the left side of the vehicle. The length and the longitudinal direction generally refer to the distance and direction between front and back. The width generally refers to the distance between left and right. The height generally refers to the distance between top and bottom, with the general exception that height with respect to the foldable assemblies 60 and components thereof is the distance measured perpendicular to the length, as shown and described herein, regardless of the orientation of the foldable assembly and/or component.

The flat conformation 42 of the foldable structure 40 is adapted to store the foldable structure. For example, the flat conformation may be adapted to store the convertible truck rack on a truck bed 12 of the truck 10. In the flat conformation, the foldable assemblies 60 are folded into a generally flat, generally compact form, e.g., the roof section 80 is folded onto the rack section 70. In the flat conformation, the foldable assemblies may be positioned generally parallel to the base 14 of the truck bed, i.e., substantially horizontal when the truck is in its operational position.

In the flat conformation 42, the convertible truck rack 40 may act like a tonneau cover, spanning between the bed rails 18 of the box 16 of the truck bed 12. More generally, the convertible truck rack in the flat conformation may span a substantial portion of the truck bed. The convertible truck rack may lie proximate to the base of the truck bed, leaving little to no useful cargo space between the convertible truck rack and the base 14 of the truck bed. The flat conformation may be elevated above the base of the truck bed, forming an enclosed space 96 bounded by the box of the truck bed and the convertible truck rack (e.g., bounded in part by the left rack section and the right rack section). The enclosed space may be a substantial fraction of the volume surrounded by the box of the truck bed. The enclosed space may be protected from the elements (e.g., wind, rain, snow, dust) by the convertible truck rack in the flat conformation. The enclosed space may be adapted to hold cargo 34. In the flat conformation 42, the left foldable assembly 62 and the right foldable assembly 64 generally fold flat over base frame 50 and, when present, the truck bed 12. Each of the foldable assemblies 60 may cover and/or enclose a portion of the truck bed. In some embodiments, the left foldable assembly and the right foldable assembly meet together over the truck bed. For example, the left foldable assembly may cover substantially half the width of the truck bed (e.g., the left half) and the right foldable assembly may cover substantially half the width of the truck bed (e.g., the right half). The left foldable assembly and the right foldable assembly may be latched together when they meet in the flat conformation. Further, the left foldable assembly and the right foldable assembly each independently may be latched to the base frame in the flat conformation.

The rack conformation 44 of the foldable structure 40 is adapted to hold and/or to carry cargo 34 above the base frame 50 and, when present, the truck bed 12 (above the base 14 of the truck bed). In the rack conformation, the foldable structure may function substantially the same as a conventional truck rack, such as a rack for building materials. The cargo may be positioned on, coupled to, and/or secured to the foldable structure in the rack conformation. The rack conformation may be adapted to carry cargo above a roof 32 of the truck 10 (e.g., the roof of the cab 30) and may be adapted to carry cargo that is longer than the length of the truck. For example, the rack conformation may be adapted to position the foldable assemblies generally perpendicular to the base of the truck bed (i.e., substantially vertical when the truck is in its operational position). The foldable assemblies generally are held in the generally perpendicular position along the edge of the truck bed, typically along the left and right sidewalls 24 of the box 16 of the truck bed (e.g., the left foldable assembly 62 generally rises vertically above the left sidewall, the right foldable assembly 64 generally rises vertically above the right sidewall). In the rack conformation, the roof section 80 of each foldable assembly 60 is folded onto the rack section 70 of the foldable assembly.

Further, the foldable structure 40 may include support members 68 that, in the rack conformation 44, span between and/or within the foldable assemblies 60 and/or that are configured to hold the foldable assemblies in the rack conformation. More generally, support members may be configured to cooperate with other elements of the foldable assemblies to hold the foldable structure in a conformation. Some support members, cross support members 69, are configured to connect between left foldable assembly 62 and right foldable assembly 64 (e.g., between left and right rack sections 70, between left and right roof sections 80, between a left rack section and a right roof section, etc.). Support members may include brackets, struts, ties, braces, compression elements (e.g., a gas piston, a spring), and/or tension elements (e.g., a cable, a spring). Support members, e.g., cross support members, may be adapted to support cargo 34 above the base frame 50 and/or above the truck bed 12. The support members may be positioned to support cargo above the roof 32 of the truck 10.

The covered conformation 46 of the foldable structure 40 is adapted to define a covered space 98 bounded by the foldable assemblies 60 and the truck bed 12. In some embodiments, the covered space is adapted to cover a person standing upright in the truck bed and/or upright under the foldable structure. The covered space may be adapted for temporary shelter (e.g., like a truck bed tent), protecting occupants from the elements (e.g., wind, rain, snow, dust).

In the covered conformation 46, the foldable assemblies 60 are unfolded, i.e., the roof section 80 is folded away from the rack section 70 of a foldable assembly. The rack sections are generally positioned at an incline to the base 14 of the truck bed (e.g., positioned generally perpendicular to the base, i.e., substantially vertical when the truck is in its operational position), while the roof sections are generally positioned to extend upwards from the rack sections and generally towards the middle of the truck bed. Further, a roof section of one of the foldable assemblies generally meets, and may be selectively coupled to, a roof section of another of the foldable assemblies. For example, the left roof section may meet the right roof section. In the covered conformation, the left roof section may meet the right roof section generally above the middle of the truck bed and the roof sections may be selectively coupled together to form the covered space 98 which may be protected from the elements.

In the covered conformation 46, the foldable structure 40 may optionally include a front panel 92 adapted to cover the front of the covered space 98 between the left foldable assembly 62 and the right foldable assembly 64. The front panel may extend to the base frame 50, the base 14 of the truck bed 12, and/or the top of the box 16 of the truck bed. In the covered conformation, the foldable structure may optionally include a rear panel 94 adapted to cover the rear of the covered space between the left foldable assembly 62 and the right foldable assembly 64. The rear panel may extend to the base frame, the base of the truck bed, the top of the box of the truck bed (e.g., the tailgate 22), and/or to the extended end of the tailgate (i.e., when the tailgate is open/down).

The base frame 50 of the foldable structure 40 generally is adapted to support the foldable structure and may be adapted to support the flat conformation 42, the rack conformation 44, and/or the covered conformation 46. The base frame is generally an open frame that is generally planar. The planar structure of the base frame may be parallel to the ground (horizontal) and/or to the base of the truck bed (and therefore substantially horizontal when the truck is in an operational position). The base frame may be adapted to rest on or be coupled to the ground and/or the truck bed 12 of the truck 10.

Where coupled to the truck bed, the base frame may be coupled to the base 14, the box 16, the bedrail 18, the head of the box 20 (e.g., the front and/or bulkhead), the tail of the box 22 (e.g., the tailgate), and/or the top of the box 26. The base frame may be configured to couple to attachment points 28 of the truck bed. For example, truck beds may include attachment points such as hooks, loops, rails, pockets (e.g., stake pockets), sockets, and/or flanges. The base frame may include one or more base couplings 56 such as hooks, loops, cables, clamps, stakes, and/or tabs.

The base frame 50 may include frame members 66 which may be elongated supports (e.g., a tube, a beam, a joist, a pole, a girder, and/or a bracket). For example, the base frame may include frame members arranged in a generally rectangular configuration that corresponds to the shape of the truck bed. The base frame may be adapted to match the size and/or to conform to the shape of the truck bed (and/or an element thereof). The base frame may be configured to accommodate protuberances, non-regularities, and/or non-uniformities of the truck bed (e.g., accommodating wheel wells, stake holes, steps, sidewalls, tapered sections, flared sections, warped sections, and/or damaged sections). Further, the base frame may include support members 68 that serve to structurally reinforce the base frame.

The base frame 50 is configured to repositionably couple to each of the foldable assemblies 60, i.e., the base frame and a foldable assembly may be coupled in one of two or more possible positions. For example, the base frame may be configured to couple to a foldable assembly in a first position corresponding to the flat conformation 42 (e.g., with the foldable assembly held in a position relatively parallel to the general plane of the base frame) and a second position corresponding to the rack conformation 44 (e.g., with the foldable assembly held in a position relatively perpendicular to the general plane of the base frame). The base frame and the foldable assemblies may be limited to coupling in defined positions or the foldable assemblies may remain coupled as the foldable assembly is transitioned between the defined positions. The foldable assemblies may be coupled to the base frame with a hinge, a bolt, a pin, a latch, a lock, a tab, a socket, a pivot, a rotary joint, an articulated joint, a flexure, a clevis, a ball joint, a fulcrum, and/or a cam.

The rack sections 70 and the roof sections 80 of the foldable assemblies 60 of the foldable structure 40 are generally rigid structures in a generally planar and generally rectangular form. The rack sections and roof sections each independently may include a frame that includes frame members 66. Rack sections and roof sections each independently may include support members 68 to structurally reinforce the section and/or to support the section in one of the conformations of the foldable structure (i.e., the flat conformation 42, the rack conformation 44, and/or the covered conformation 46). Support members may be and/or may include biasing mechanisms 58 which are adapted to bias the foldable structure into one or more of the conformations of the foldable structure. For example, biasing mechanisms, such as springs or gas struts, may be coupled between the base frame 50 and a foldable assembly 60 to assist opening the foldable structure from the flat conformation to the rack conformation.

Rack sections 70 and roof sections 80 may be adapted to nest together such that one section fits substantially within the profile of another section. For example, a roof section may be adapted to fold or lay against a rack section in a close fitting manner. As another example, frame members 66 and support members 68 of rack sections 70 and roof sections 80 may have a channel profile that is adapted to receive a frame member and/or support member of another roof section or rack section.

Rack sections 70 and roof sections 80 may be extensible and/or adapted to maintain a stowed conformation and an extended conformation, which has a larger profile than the stowed conformation.

The rack sections and roof sections generally are in a stowed conformation when the foldable structure 40 is in a flat conformation 42. When the foldable structure is in a rack conformation 44, the rack sections generally are in an extended conformation while the roof sections generally are in a stowed conformation. When the foldable structure is in a covered conformation 46, the rack sections and the roof sections generally are in an extended conformation. Extensible rack sections and extensible roof sections may include extensible frame members 66 and/or support members 68 (e.g., telescoping and/or foldable).

Frame members 66 and support members 68 of rack sections 70 and roof sections 80 may be rigidly coupled together and/or may be flexibly coupled together. For example, support members may be coupled by a hinge to frame members or other support members. As another example, support members may be locked into a rigid configuration to frame members or other support members with a rigid fastener (e.g., a pin, a bolt, a cam lock, or a snap lock). As yet another example, cross supports 69 may be releasably coupled on one end to a rack section or roof section while flexibly coupled on an opposite end to another rack section or roof section. Flexibly coupled elements generally are adapted to flex towards the inside of the covered conformation 46 of the foldable structure 40. Thus, in transitioning the foldable structure from the covered conformation to the rack conformation 44 and/or the flat conformation 42, flexible elements generally flex towards the inside of the covered conformation.

Rack sections 70 and roof sections 80 may include, or may be, a panel. For example, the rack section may include a rack panel 78. As another example, the roof section may include a roof panel 88. The rack panels and the roof panels each independently may be a covering, overlay, or insert that spans a substantial fraction of the corresponding section and/or frame of the section. The rack panels and the roof panels each independently may be flexible, rigid, and/or include flexible or rigid portions. A section with a panel may form a visually solid wall. The rack panels and the roof panels each independently may be resistant to wind and rain from the environment. Panels may be porous and/or breathable, e.g., allowing water vapor to pass through the panel while repelling liquid water. Sections with panels may include structures (e.g., flaps, gussets, and/or gaskets) configured to flexibly connect and/or seal between the sections. For example, rack sections 70, roof sections 80, panels 78, and/or panels 88 may include flaps, gussets, and/or gaskets along one or more edges.

The rack sections 70 may be adapted to match the size of and/or to conform to the truck bed 12 (e.g., the sidewall of the box 24). Typically, the rack sections are adapted to substantially span the length of the truck bed (between front and back), i.e., the length 72 of the rack section is substantially the same as the length of the truck bed. The rack sections 70 are adapted to repositionably couple to the base frame 50 at a first end of the rack section (the base coupling end 76), generally along the length 72 of the rack section and generally along one side of the base frame (e.g., the left side 52 or the right side 54). The rack sections 70 may be coupled to the base frame as described herein. Further, the rack sections are adapted to flexibly couple a roof section 80 at a second end of the rack section (the roof coupling end 77) opposite the first end, generally along the length 72 of the rack section, spaced apart from the base frame. Generally, the base coupling and the roof coupling are spaced apart along a dimension substantially perpendicular to the length 72 of the rack section. This dimension is referred to herein as the height 74 of the rack section. In some conformations, the height 74 of the rack section may be oriented horizontally, vertically, or obliquely, i.e., the height 74 of the rack section is the dimension substantially perpendicular to the length 72 of the rack section regardless of the position of the rack section. Where a rack section is extensible and/or adapted to maintain a stowed conformation and an extended conformation, the rack section generally extends along the height 74 direction, increasing the height 74 of the rack section in the extended conformation.

The rack section 70 and the roof section 80 of a foldable assembly 60 are flexibly coupled, i.e., one section may move relative to the other section while remaining coupled. The rack section may be coupled to the roof section with a hinge, a bolt, a pin, a pivot, a rotary joint, an articulated joint, a flexure, a clevis, a ball joint, a fulcrum, and/or a cam. Roof sections are adapted to fold (e.g., nest and/or stack) against the coupled rack section and are adapted to fold away from the coupled rack section, generally toward the truck bed 12 and the inside of the covered conformation 46. The roof sections 80 may have a length 82 that is substantially the same as the length 72 of the rack section 70 of the same foldable structure 40. The roof sections have a height 84, a dimension perpendicular to the length 82 of the roof section, that is the same as or less than the height 74 of the rack section of the same foldable structure. In some conformations, the height 84 of the roof section may be oriented horizontally, vertically, or obliquely, i.e., the height 84 of the roof section is the dimension substantially perpendicular to the length 82 of the roof section regardless of the position of the roof section. Where a roof section is extensible and/or adapted to maintain a stowed conformation and an extended conformation, the roof section generally extends along the height 84 direction, increasing the height 84 of the roof section in the extended conformation. The roof sections 80 generally are not directly coupled to the base frame. Instead, roof sections are flexibly coupled, at one end of the roof section (the rack coupling end 86), to the roof coupling end 77 of a rack section 70. The other end of the roof section (the roof coupling end 87) generally is adapted to mate and/or couple to another roof section of the foldable structure. For example, in the covered conformation 46, the left roof section may couple to the right roof section at the roof sections' corresponding roof coupling ends.

Foldable assemblies 60 may include more than one roof section 80, for example, a first roof section 180 and a second roof section 280. Generally, the roof sections are linked in a linear sequence by flexible couplings to the rack section 70, e.g., the second roof section is flexibly coupled to the first roof section which is flexibly coupled to the rack section. Roof sections may be flexibly coupled to other roof sections in the same manner described herein with respect to a roof section coupling to a rack section. Each roof section independently may include a roof panel 88

Where a roof section 80 is flexibly coupled to more than one other section (such as a rack section 70 or another roof section), the sections are coupled in a spaced apart manner. For example, the first roof section 180 may be coupled to the rack section on a first end (the rack coupling end 86 of the roof section), generally along the length 72 of the rack section and the length 82 of the roof section. Further, the first roof section may be coupled to the second roof section 280 at a second end of the first roof section (the roof coupling end of the first roof section). Alternatively stated, the roof coupling end 77 of the rack section may be flexibly coupled to the rack coupling end 86 of the first roof section. The roof coupling end 87 of the first roof section may be flexibly coupled to a roof coupling end 87 of the second roof section. The second roof section may include a second roof coupling end 87, spaced apart from the roof coupling end 87 that is coupled to the first roof section. The second roof coupling end 87 of the second roof section may be adapted to couple to another roof section of a different foldable assembly 60.

Where a foldable assembly 60 includes more than one roof section 80, each roof section has a height 84 that is less than or equal to the height of the section(s) (roof section or rack section 70) that is coupled closer to the base frame. For example, the rack section of a foldable assembly may have a height 74 that is greater than all other roof sections of the foldable assembly. The height 84 of the first roof section 180 may be less than the height 74 of the rack section, while the height 84 of the second roof section 280 may be less than the height 84 of the first roof section.

Foldable structures 40 may include a covering 90 that is adapted to cover at least a portion of the foldable structure in the flat conformation 42, the rack conformation 44, and/or the covered conformation 46. The covering may include a rack panel 78, a roof panel 88, a front panel 92, and/or a rear panel 94. For example, the covering may be adapted to cover and/or protect the covered space 98 of the covered conformation. The covering may be substantially water resistant, substantially wind resistant, and/or substantially breathable. The covering may be flexible or rigid, or may include flexible or rigid portions. The covering may be substantially composed of a flexible material and may include fabric, leather, sheeting, and/or film. The covering may include several sections which may be permanently, semi-permanently, or temporarily coupled together. For example, the covering may include seams that separate, expand, and/or compress to accommodate changes in the shape of the foldable structure as the foldable structure transitions between conformations.

Foldable structures 40 may include accessories such as windows 102, doors 104, locks, latches, hinges, seals, hooks, sockets, and/or nets. Windows and doors may be rigid, flexible, or include rigid and/or flexible components. For example, windows may include glass, transparent plastic, and/or mesh.

As other examples, doors may include a rigid panel that swings on a hinge, or may be a flexible flap or opening.

Figure 2:
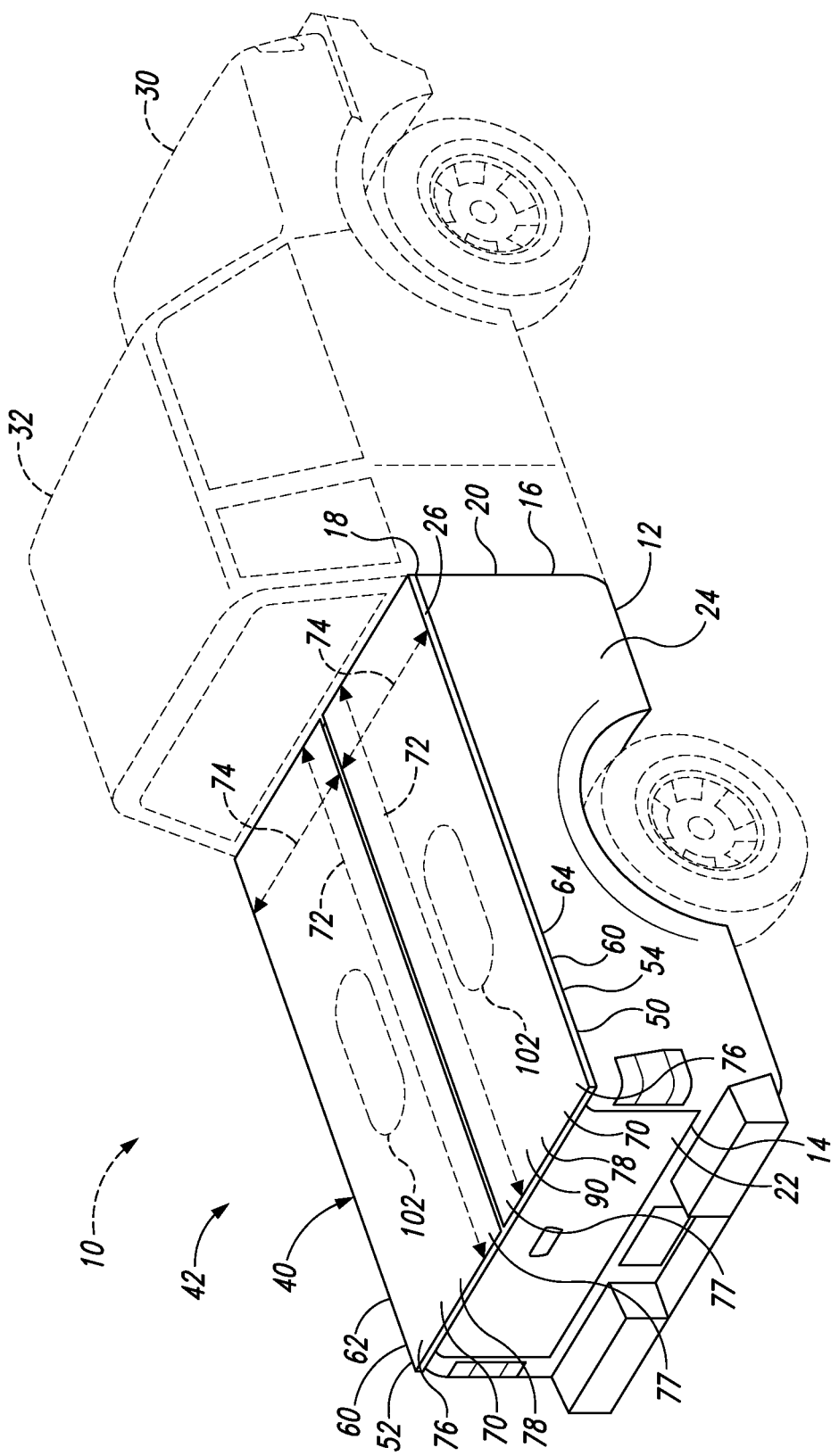
FIG. 2 is a perspective drawing of an illustrative, non-exclusive example of a foldable structure in a flat conformation.
Figure 3:
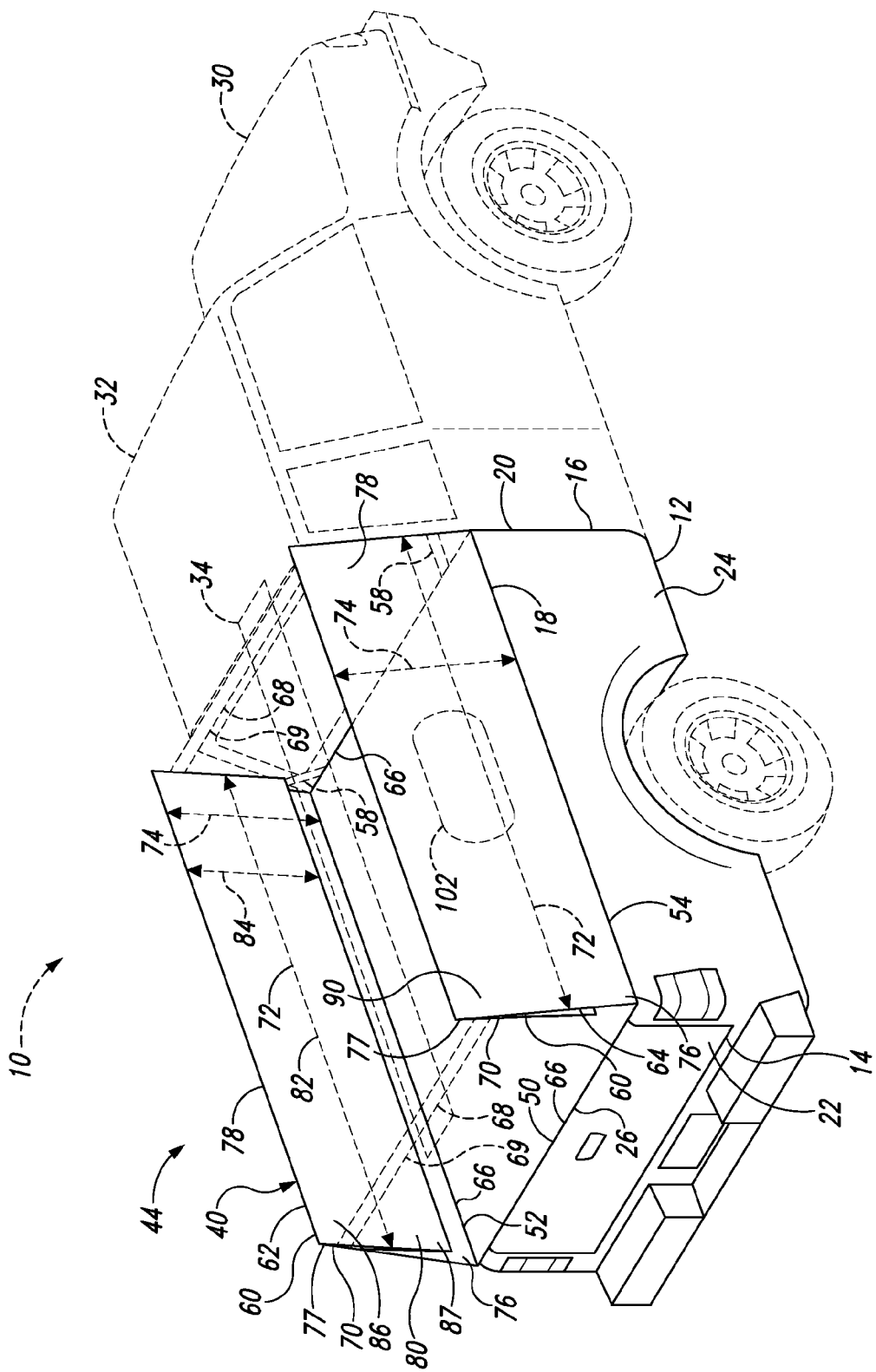
FIG. 3 is a perspective drawing of an illustrative, non-exclusive example of a foldable structure in a rack conformation.
Figure 4:
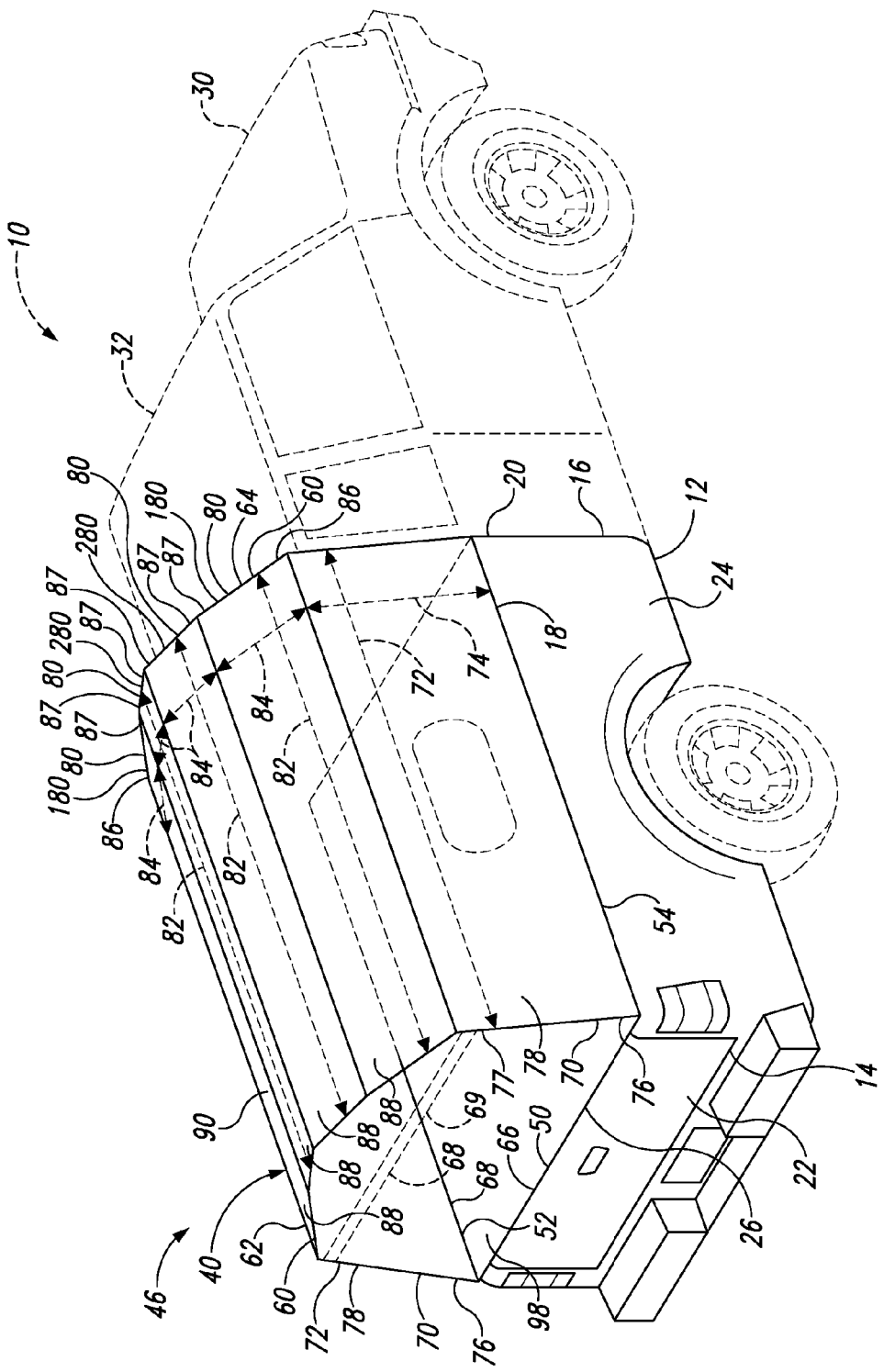
FIG. 4 is a perspective drawing of an illustrative, non-exclusive example of a foldable structure in a covered conformation.

FIGS. 2-4 present an illustrative, non-exclusive example of a foldable structure 40 in three different conformations, the flat conformation 42 (FIG. 2), the rack conformation 44 (FIG. 3), and the covered conformation 46 (FIG. 4). Each of FIGS. 2-4 also shows the optional assembly of the foldable structure 40 on a vehicle 10. Though illustrated on the box 16 of a truck bed 12, foldable structures 40 may be situated on the ground, for example to form a rack and/or a canopy.

FIG. 2 illustrates a flat conformation 42 in which the foldable structure 40 substantially covers the top 26 of the box 16 of the truck bed 12 of the vehicle 10. The base frame 50 is coupled to the bed rails 18 of the box 16 with base coupling 56 (e.g., clamps, bolts, hooks, etc.). The left foldable assembly 62 covers substantially the left half of the box (generally with the left rack section 70 exposed/up). The right foldable assembly 64 covers substantially the right half of the box (generally with the right rack section 70 exposed/up). As disclosed, the left foldable assembly 62 and the right foldable assembly 64 each independently may include a panel (such as rack panels 78) and/or covering 90. Where the rack sections 70 and/or rack panels 78 meet across the middle of the bed 12, the rack sections, rack panels, and/or covering may include a flap, gasket, flange, etc. to cover and/or seal the gap. The left foldable assembly 62 and the right foldable assembly 64 may be secured in the flat conformation 42 with a latch and/or fastener. Additionally or alternatively, the flap, gasket, flange, etc. may be secured by a fastener. For example, a flap may be secured by Velcro™ fasteners, snaps, buttons, ties, etc.

FIG. 3 illustrates a rack conformation 44 in which the foldable structure 40 includes support members 68 configured to support cargo 34 above the roof 32 of the vehicle 10. The rack sections 70 of the foldable assemblies 60 are in a substantially vertical position. The roof sections 80 are folded onto the rack sections 70, on the inside of the rack sections (i.e., toward the center of the vehicle 10).

FIG. 4 illustrates a covered conformation 46 in which the foldable assemblies 60 (the left foldable assembly 62 and the right foldable assembly 64) are unfolded and coupled together (above the center of the box 16). The roof coupling end 87 of the second roof section 280 of the left foldable assembly 62 is coupled to the roof coupling end 87 of the second roof section 280 of the right foldable assembly 64.

Figure 5:
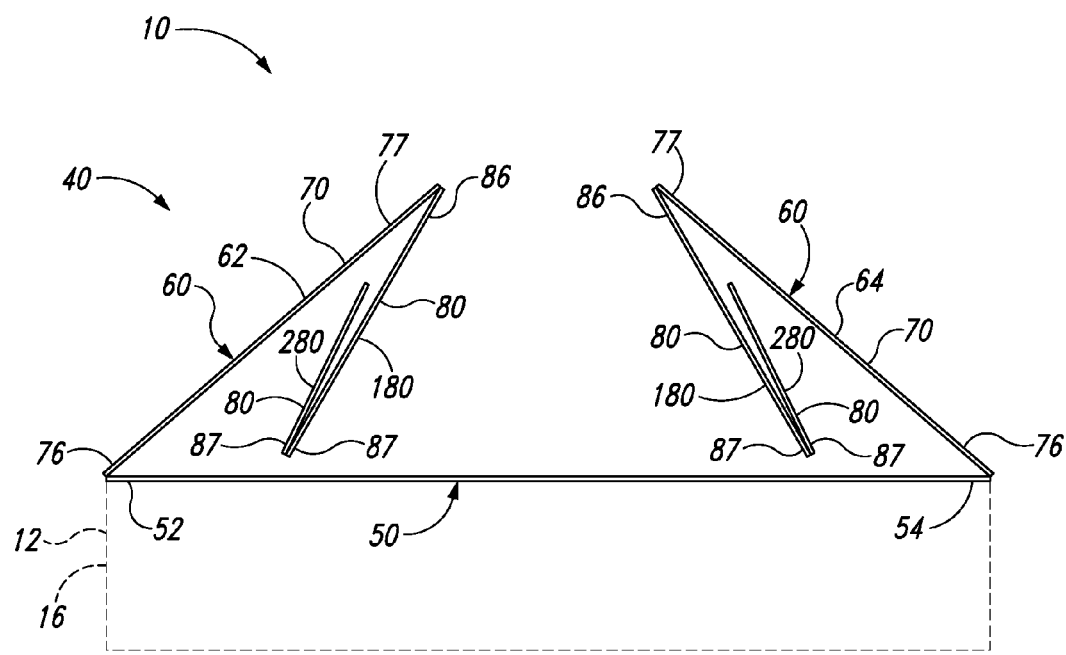
FIG. 5 is an end view of an illustrative, non-exclusive example of a foldable structure in a partially folded conformation.

FIG. 5 is an end view of an illustrative, non-exclusive example of a foldable structure 40 which highlights the linked relationship between the truck bed 12 (or ground), the base frame 50, rack sections 70, and the roof sections 80 (in this example including a first roof section 180 and a second roof section 280). As shown, the base frame is coupled to the top 26 of the box 16 of the truck bed 12 of the truck 10. The left side 52 of the base frame is repositionably coupled to the left foldable assembly 62. The right side 54 of the base frame is repositionably coupled to the right foldable assembly 64. The foldable assemblies 60 (i.e., the left foldable assembly and the right foldable assembly) each include a rack section, a first roof section, and a second roof section. The rack section of each foldable assembly is coupled to the base frame at the base coupling end 76 of the rack section (i.e., the left side of the base frame is coupled to the base coupling end of the left rack section and the right side of the base frame is coupled to the base coupling end of the right rack section). The rack sections also are flexibly coupled to corresponding roof sections at the roof coupling end 77 of the rack section and the rack coupling end 86 of the roof section (i.e., the left rack section is coupled at the roof coupling end 77 to the first left roof section at the rack coupling end 86 and the right rack section is coupled at the roof coupling end 77 to the first right roof section at the rack coupling end 86). The first roof sections also are flexibly coupled to the corresponding second roof sections at the roof coupling ends 87 of the roof sections (i.e., the first left roof section is coupled at the roof coupling end 87 to the second left roof section at a roof coupling end 87 and the first right roof section is coupled at the roof coupling end 87 to the second right roof section at a roof coupling end 87). Further, the second roof sections each have a roof coupling section that is adapted to couple to the other second roof section (i.e., the second left roof section includes a roof coupling end 87 that is adapted to couple to a roof coupling end 87 of the second right roof section).

FIG. 5 also illustrates how the roof sections 80 may fold onto the rack section 70 of the foldable assemblies 60. The rack sections 70 and the roof sections 80 have a height 74 (rack sections) or height 84 (roof sections) that is progressively less than the height of the section that is more closely coupled to base frame 50. The height 74 of the rack section of a foldable assembly is larger than the height 84 of the first roof section 180 and larger than the height 84 of the second roof section 280. The height 84 of the first roof section is larger than the height 84 of the second roof section. The roof sections are adapted to fold into the general profile of the rack section. The roof section may fold sequentially in the same direction (as illustrated) or may fold in opposite directions (forming a zigzag profile).

Figure 6:
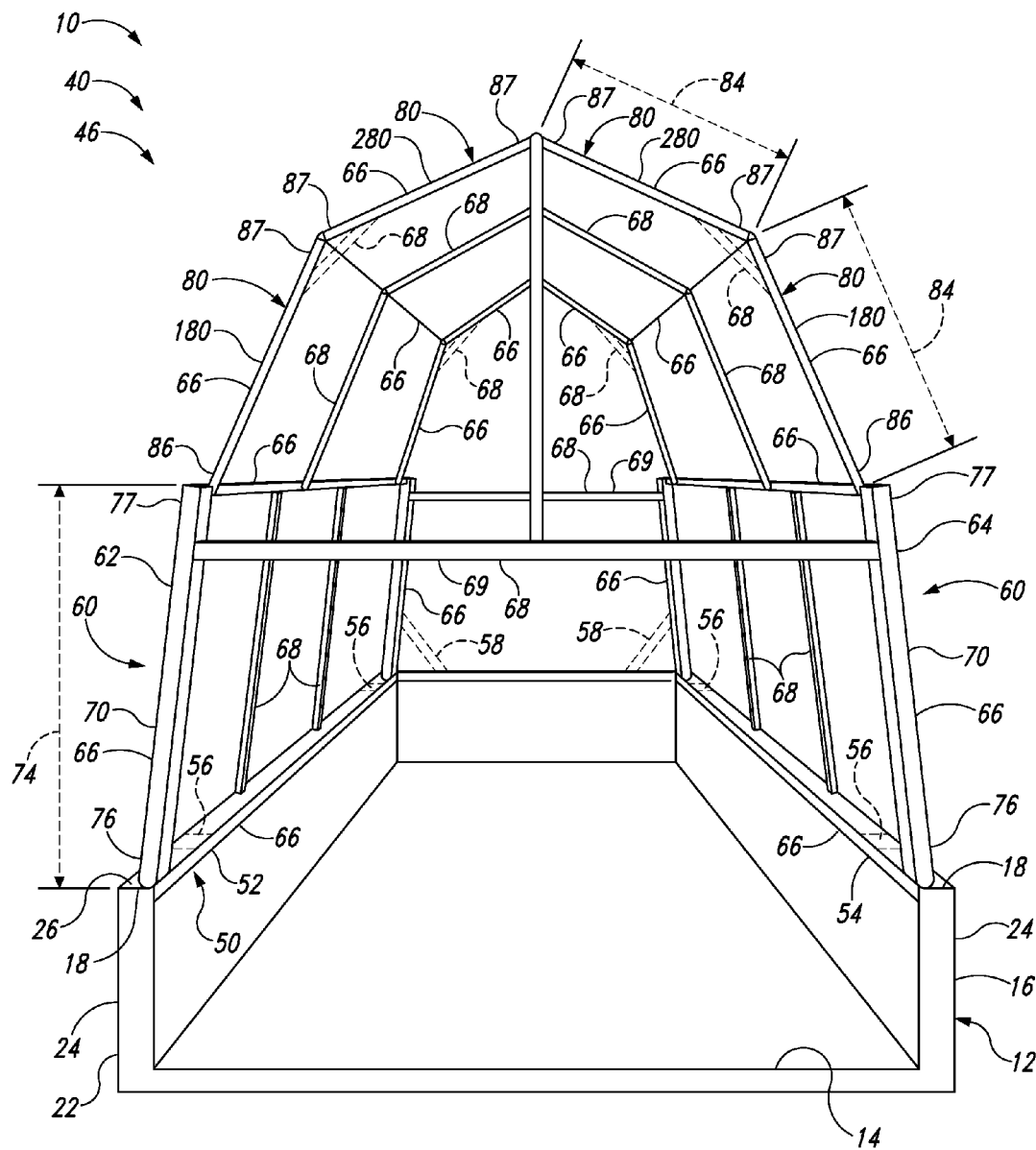
FIG. 6 is a perspective frame view of an illustrative, non-exclusive example of a foldable structure in a covered conformation.

FIG. 6 is a frame view of an illustrative, non-exclusive example of a foldable structure 40 detailing the arrangement of the base frame 50 and the foldable assemblies 60 in a covered conformation 46. In the example of FIG. 6, the rack sections 70 each include two support members 68. The roof sections 80 each include one support member 68. The rack sections 70 are at least partially supported in the upright position by front and rear cross supports 69 that extend between the left rack section and the right rack section. The base frame 50 may include frame members 66 (e.g., the frame members adapted to couple to the left and right bed rails 18), adapted to rest generally atop the sidewalls 24 and within the box 16 near the sidewalls (e.g., the frame members may have an L-profile).

Figure 7:
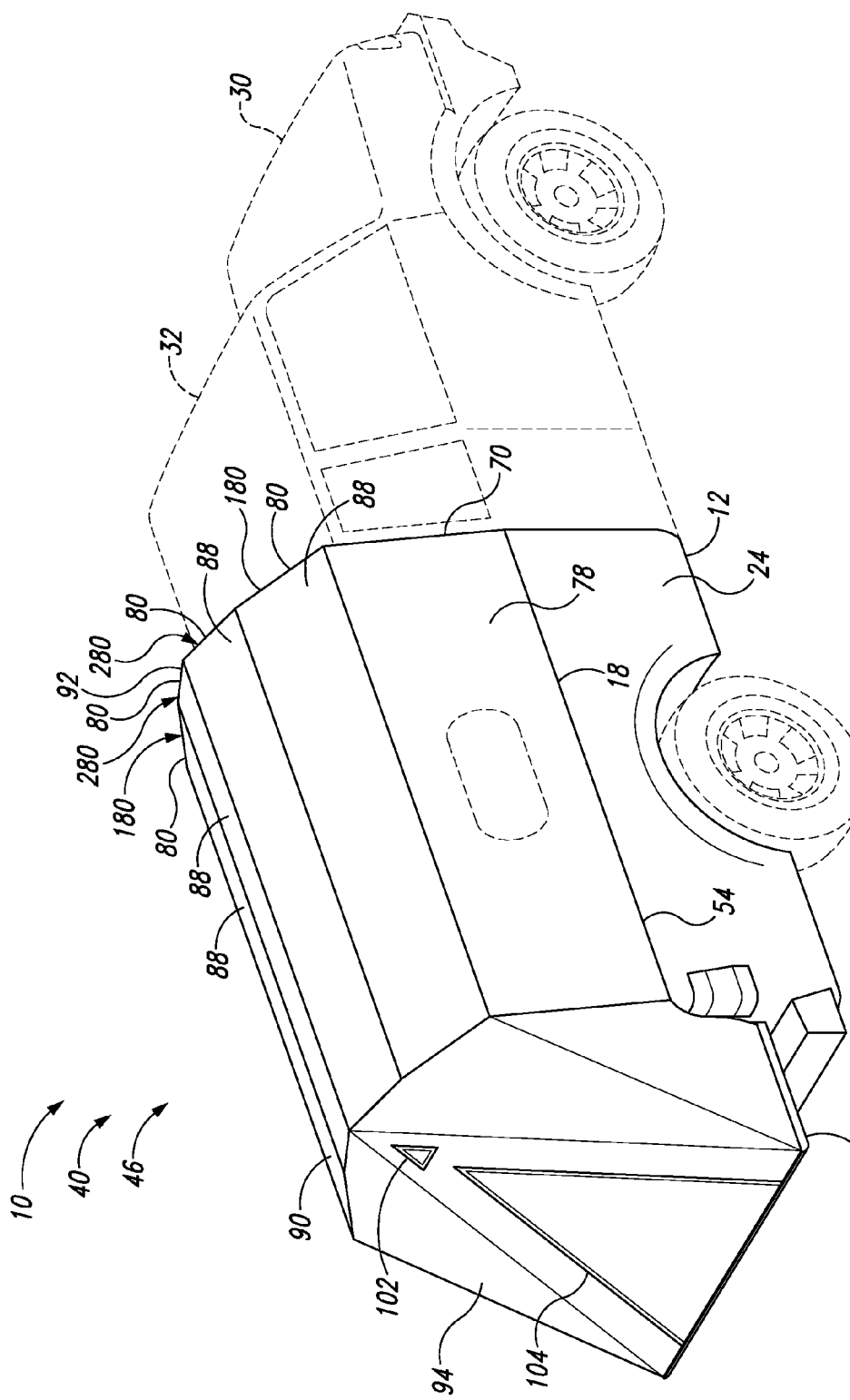
FIG. 7 is a perspective drawing of an illustrative, non-exclusive example of a foldable structure in a covered conformation, including a covering.

FIG. 7 is a perspective drawing (as viewed generally from behind the truck 10) of an illustrative, non-exclusive example of a foldable structure 40 in a covered conformation 46 and including a covering 90. The covering 90 may include several sections that overlap to form a protected enclosed space in the covered conformation 46. Generally, sections of the covering are coupled together by seams and fasteners. One or more sections may correspond to, be associated with, and/or be a panel such as a rack panel 78 or a roof panel 88. At the edges of rack sections 70, roof sections 80, and/or panels, the covering 90 may include flaps, gussets, and/or gaskets to form a flexible connection and/or seal between the rack sections, roof sections, and/or panels.

The covering 90 may be coupled to the frame members 66 and support members 68 by fasteners (e.g., ties, clips, snaps, Velcro™ fasteners, etc.). Some portions of the covering 90 may be coupled to the truck by fasteners. The covering 90 may include one or more windows 102 (which may be rigid or flexible), for example, a window near the peak of the rear panel 94 and/or a window near the peak of the front panel 92 (not shown in FIG. 7). The windows 102 may include a mesh screen and an inner flap.

The covering 90 includes a door 104 in the rear panel 94. The door 104 may be a flap door that may be rolled and/or folded toward the top, bottom, and/or one or more sides. The door 104 may include one or more windows 102. The rear panel 94 and/or door 104 may extend from the peak of the rear of the foldable structure 40 (e.g., where the roof sections 80 meet in the covered conformation 46) to the rear of the box 16 and/or to the extended end of the tailgate 22 (as shown in FIG. 7).

Illustrative, non-exclusive examples of foldable structures and vehicles incorporating the same according to the present disclosure are described in the following enumerated paragraphs:

A1. A convertible rack for a truck, the convertible rack comprising:

a base frame with a left side and a right side, wherein the base frame is adapted to couple to a truck bed of the truck;

a left foldable assembly including a left rack section and a left roof section flexibly coupled together, wherein the left rack section is repositionably coupled to the left side of the base frame; and a right foldable assembly including a right rack section and a right roof section flexibly coupled together, wherein the right rack section is repositionably coupled to the right side of the base frame;

wherein the convertible rack is adapted to form a flat conformation, a rack conformation, and a covered conformation.

A2. The convertible rack of paragraph A1, wherein the flat conformation includes the left roof section folded onto the left rack section, the left rack section positioned generally parallel to a base of the truck bed, the right roof section folded onto the right rack section, and the right rack section positioned generally parallel to the base of the truck bed.

A2.1. The convertible rack of paragraph A2, wherein the left rack section is positioned substantially horizontal when the truck is in an operational position.

A2.2. The convertible rack of any of paragraphs A2-A2.1, wherein the right rack section is positioned substantially horizontal when the truck is in an operational position.

A3. The convertible rack of any of paragraphs A1-A2.2, wherein the flat conformation is adapted to store the convertible rack on the truck bed.

A4. The convertible rack of any of paragraphs A1-A3, wherein the flat conformation is adapted to span between bed rails of a box of the truck bed.

A5. The convertible rack of any of paragraphs A1-A4, wherein the flat conformation is adapted to form an enclosed space bounded by the left rack section, the right rack section, and a box of the truck bed.

A6. The convertible rack of any of paragraphs A1-A5, wherein the flat conformation includes the left foldable section latched the right foldable section.

A7. The convertible rack of any of paragraphs A1-A6, wherein the rack conformation includes the left roof section folded onto the left rack section, the left rack section positioned generally perpendicular to a base of the truck bed, the right roof section folded onto the right rack section, and the right rack section positioned generally perpendicular to the base of the truck bed.

A7.1. The convertible rack of paragraph A7, wherein the left rack section is positioned substantially vertical when the truck is in an operational position.

A7.2. The convertible rack of any of paragraphs A7-A7.1, wherein the right rack section is positioned substantially vertical when the truck is in an operational position.

A8. The convertible rack of any of paragraphs A1-A7.2, wherein the rack conformation is adapted to carry cargo above the truck bed.

A9. The convertible rack of any of paragraphs A1-A8, wherein the rack conformation is adapted to carry cargo above a roof of the truck.

A10. The convertible rack of any of paragraphs A1-A9, wherein the rack conformation is adapted to carry cargo that is longer than a length of the truck bed.

A11. The convertible rack of any of paragraphs A1-A10, wherein the covered conformation includes the left roof section temporarily coupled to the right roof section.

A12. The convertible rack of any of paragraphs A1-A11, wherein the covered conformation defines a covered space bounded by the left foldable assembly, the right foldable assembly, and the truck bed.

A12.1. The convertible rack of paragraph A12, further comprising:

a front panel adapted to cover a front of the covered space between the left foldable assembly, the right foldable assembly, and the base frame; and a rear panel adapted to cover a rear of the covered space between the left foldable assembly, the right foldable assembly, and the base frame.

A12.2. The convertible rack of any of paragraphs A12-A12.1, wherein the covered space is adapted to cover a person standing upright.

A12.3. The convertible rack of any of paragraphs A12-A12.2, wherein the left roof section is selectively coupled to the right roof section.

A13. The convertible rack of any of paragraphs A1-A12.3, wherein the covered conformation includes the left roof section folded away from the left rack section, the left rack section positioned at an incline to a base of the truck bed, the right roof section folded away from the right rack section, and the right rack section positioned at an incline to the base of the truck bed, and optionally wherein the left roof section is selectively coupled to the right roof section.

A13.1. The convertible rack of paragraph A13, wherein, in the covered conformation, the left rack section is positioned generally perpendicular to the base of the truck bed.

A13.2. The convertible rack of any of paragraphs A13-A13.1, wherein, in the covered conformation, the right rack section is positioned generally perpendicular to the base of the truck bed.

A13.3. The convertible rack of any of paragraphs A13-A13.2, wherein the left rack section is positioned substantially vertical when the truck is in an operational position.

A13.4. The convertible rack of any of paragraphs A13-A13.3, wherein the right rack section is positioned substantially vertical when the truck is in an operational position.

A14. The convertible rack of any of paragraphs A1-A13.4, wherein the base frame is adapted to couple to a bed rail of a box of the truck bed.

A15. The convertible rack of any of paragraphs A1-A14, wherein the base frame is adapted to couple to a top of a box of the truck bed.

A16. The convertible rack of any of paragraphs A1-A15, wherein the base frame is adapted to latch at least one of the left foldable assembly and the right foldable assembly to the base in the flat conformation.

A17. The convertible rack of any of paragraphs A1-A16, wherein the base frame is adapted to selectively couple the left foldable assembly in at least two, optionally at least three, distinct positions.

A17.1. The convertible rack of paragraph A17, wherein one of the at least two distinct positions corresponds to the flat conformation.

A17.2. The convertible rack of any of paragraphs A1-A17.1, wherein one of the at least two distinct positions corresponds to the rack conformation.

A17.3. The convertible rack of any of paragraphs A1-A17.2, wherein one of the at least two distinct positions corresponds to the covered conformation.

A17.4. The convertible rack of any of paragraphs A1-A17.3, wherein one of the at least two distinct positions is a substantially horizontal position when the truck is in an operational position.

A17.5. The convertible rack of any of paragraphs A1-A17.4, wherein one of the at least two distinct positions is a substantially vertical position when the truck is in an operational position.

A18. The convertible rack of any of paragraphs A1-A17.5, wherein the base frame is adapted to selectively couple the right foldable assembly in at least two, optionally at least three, distinct positions.

A18.1. The convertible rack of paragraph A18, wherein one of the at least two distinct positions corresponds to the flat conformation.

A18.2. The convertible rack of any of paragraphs A18-A18.1, wherein one of the at least two distinct positions corresponds to the rack conformation.

A18.3. The convertible rack of any of paragraphs A18-A18.2, wherein one of the at least two distinct positions corresponds to the covered conformation.

A18.4. The convertible rack of any of paragraphs A18-A18.3, wherein one of the at least two distinct positions is a substantially horizontal position when the truck is in an operational position.

A18.5. The convertible rack of any of paragraphs A18-A18.4, wherein one of the at least two distinct positions is a substantially vertical position when the truck is in an operational position.

A19. The convertible rack of any of paragraphs A1-A18.5, wherein the left rack section has a height that is larger than a height of the left roof section.

A20. The convertible rack of any of paragraphs A1-A19, wherein the right rack section has a height that is larger than a height of the right roof section.

A21. The convertible rack of any of paragraphs A1-A20, wherein the left foldable assembly is coupled to the left side of the base frame with at least one of a hinge, a bolt, a pin, a latch, a lock, a tab, a socket, a pivot, a rotary joint, an articulated joint, a flexure, a clevis, a ball joint, a fulcrum, and a cam.

A22. The convertible rack of any of paragraphs A1-A21, wherein the right foldable assembly is coupled to the right side of the base frame with at least one of a hinge, a bolt, a pin, a latch, a lock, a tab, a socket, a pivot, a rotary joint, an articulated joint, a flexure, a clevis, a ball joint, a fulcrum, and a cam.

A23. The convertible rack of any of paragraphs A1-A22, wherein the left rack section is coupled to the left roof section with at least one of a hinge, a bolt, a pin, a pivot, a rotary joint, an articulated joint, a flexure, a clevis, a ball joint, a fulcrum, and a cam.

A24. The convertible rack of any of paragraphs A1-A23, wherein the right rack section is coupled to the right roof section with at least one of a hinge, a bolt, a pin, a pivot, a rotary joint, an articulated joint, a flexure, a clevis, a ball joint, a fulcrum, and a cam.

A25. The convertible rack of any of paragraphs A1-A24, wherein the left rack section includes a left rack panel substantially longitudinally spanning the left rack section.

A26. The convertible rack of any of paragraphs A1-A25, wherein the right rack section includes a right rack panel substantially longitudinally spanning the right rack section.

A27. The convertible rack of any of paragraphs A1-A26, wherein the left roof section includes a left roof panel substantially longitudinally spanning the left roof section.

A28. The convertible rack of any of paragraphs A1-A27, wherein the right roof section includes a right roof panel substantially longitudinally spanning the right roof section.

A29. The convertible rack of any of paragraphs A1-A28, wherein the left roof section is a first left roof section, and wherein the left foldable assembly includes a second left roof section flexibly coupled to the first left roof section.

A29.1. The convertible rack of paragraph A29, wherein the first left roof section has a height that is larger than a height of the second left roof section.

A29.2. The convertible rack of any of paragraphs A29-A29.1, wherein the first left roof section is coupled to the second left roof section with at least one of a hinge, a bolt, a pin, a pivot, a rotary joint, an articulated joint, a flexure, a clevis, a ball joint, a fulcrum, and a cam.

A29.3. The convertible rack of any of paragraphs A29-A29.2, wherein the second left roof section includes a second left roof panel substantially longitudinally spanning the second left roof section.

A30. The convertible rack of any of paragraphs A1-A29.3, wherein the right roof section is a first right roof section, and wherein the right foldable assembly includes a second right roof section flexibly coupled to the first right roof section.

A30.1. The convertible rack of paragraph A30, wherein the first right roof section has a height that is larger than a height of the second right roof section.

A30.2. The convertible rack of any of paragraphs A30-A30.1, wherein the first right roof section is coupled to the second right roof section with at least one of a hinge, a bolt, a pin, a pivot, a rotary joint, an articulated joint, a flexure, a clevis, a ball joint, a fulcrum, and a cam.

A30.3. The convertible rack of any of paragraphs A30-A30.2, wherein the second right roof section includes a second right roof panel substantially longitudinally spanning the second right roof section.

A31. The convertible rack of any of paragraphs A1-A30.3, wherein the left rack section is adapted to be substantially as long as the truck bed.

A32. The convertible rack of any of paragraphs A1-A31, wherein the right rack section is adapted to be substantially as long as the truck bed.

A33. The convertible rack of any of paragraphs A1-A32, wherein, in the flat conformation, the left rack section is adapted to cover substantially half the width of the truck bed.

A34. The convertible rack of any of paragraphs A1-A33, wherein, in the flat conformation, the right rack section is adapted to cover substantially half the width of the truck bed.

A35. The convertible rack of any of paragraphs A1-A34, wherein, in the rack conformation, the left rack section is adapted to rise taller than a roof of the truck.

A36. The convertible rack of any of paragraphs A1-A35, wherein, in the rack conformation, the right rack section is adapted to rise taller than a roof of the truck.

A37. The convertible rack of any of paragraphs A1-A36, wherein the convertible rack further comprises a rack covering adapted to cover the convertible rack in the covered conformation.

A37.1. The convertible rack of paragraph A37, when dependent on paragraph A12.1, wherein the rack covering includes the front panel and the rear panel.

A37.2. The convertible rack of any of paragraphs A37-A37.1, wherein the rack covering is substantially composed of a flexible material, optionally one or more of a fabric, a leather, a sheet, and a film.

A37.3. The convertible rack of any of paragraphs A37-A37.2, wherein the rack covering is adapted to protect a/the covered space from rain and/or wind.

A37.4. The convertible rack of any of paragraphs A37-A37.3, wherein the rack covering is substantially water resistant.

A37.5. The convertible rack of any of paragraphs A37-A37.4, wherein the rack covering is substantially wind resistant.

A38. A truck comprising:
a truck bed; and
the convertible rack of any of paragraphs A1-A37.5.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, when the disclosure, the preceding numbered paragraphs, or subsequently filed claims recite "a" or "a first" element or the equivalent thereof, such claims should be understood to include incorporation of one or more such elements, neither requiring nor excluding two or more such elements.

The invention claimed is:

1. A convertible rack for a truck, the convertible rack comprising:
a base frame with a left side and a right side, wherein the base frame is adapted to couple to a truck bed of the truck;
a left foldable assembly including a left rack section and a left roof section flexibly coupled together, wherein the left rack section is repositionably coupled to the left side of the base frame; and
a right foldable assembly including a right rack section and a right roof section flexibly coupled together, wherein the right rack section is repositionably coupled to the right side of the base frame;
wherein the convertible rack is adapted to form a flat conformation, a rack conformation, and a covered conformation;
wherein the flat conformation includes the left roof section folded onto the left rack section, the left rack section positioned generally parallel to a base of the truck bed, the right roof section folded onto the right rack section, and the right rack section positioned generally parallel to the base of the truck bed;
wherein the rack conformation includes the left roof section folded onto the left rack section, the left rack section positioned generally perpendicular to the base of the truck bed, the right roof section folded onto the right rack section, and the right rack section positioned generally perpendicular to the base of the truck bed; and wherein the covered conformation includes the left roof section folded away from the left rack section, the left rack section positioned at an incline to the base of the truck bed, the right roof section folded away from the right rack section, and the right rack section positioned at an incline to the base of the truck bed.

2. The convertible rack of claim 1, wherein the base frame is adapted to selectively couple the left foldable assembly in at least three distinct positions corresponding to at least the flat conformation, the rack conformation, and the covered conformation, and wherein the base frame is adapted to selectively couple the right foldable assembly in at least three distinct positions corresponding to at least the flat conformation, the rack conformation, and the covered conformation.

3. The convertible rack of claim 1, wherein, in the covered conformation, the left roof section is selectively coupled to the right roof section.

4. The convertible rack of claim 1, wherein the left rack section has a height that is larger than a height of the left roof section, and wherein the right rack section has a height that is larger than a height of the right roof section.

5. The convertible rack of claim 1, wherein the left rack section includes a left rack panel substantially longitudinally spanning the left rack section, and wherein the right rack section includes a right rack panel substantially longitudinally spanning the right rack section.

6. The convertible rack of claim 1, wherein the left roof section includes a left roof panel substantially longitudinally spanning the left roof section, and wherein the right roof section includes a right roof panel substantially longitudinally spanning the right roof section.

7. The convertible rack of claim 1, wherein the left roof section is a first left roof section, wherein the left foldable assembly includes a second left roof section flexibly coupled to the first left roof section, wherein the right roof section is a first right roof section, and wherein the right foldable assembly includes a second right roof section flexibly coupled to the first right roof section.

8. The convertible rack of claim 7, wherein the first left roof section has a height that is larger than a height of the second left roof section, and wherein the first right roof section has a height that is larger than a height of the second right roof section.

9. The convertible rack of claim 7, wherein the second left roof section includes a second left roof panel substantially longitudinally spanning the second left roof section, and wherein the second right roof section includes a second right roof panel substantially longitudinally spanning the second right roof section.

10. The convertible rack of claim 1, wherein the flat conformation is adapted to form an enclosed space bounded by the left rack section, the right rack section, and a box of the truck bed.

11. The convertible rack of claim 1, wherein the flat conformation includes the left foldable section latched the right foldable section.

12. The convertible rack of claim 1, wherein the base frame is adapted to latch at least one of the left foldable assembly and the right foldable assembly to the base in the flat conformation.

13. The convertible rack of claim 1, wherein the rack conformation is adapted to carry cargo above the truck bed.

14. The convertible rack of claim 1, wherein the covered conformation defines a covered space bounded by the left foldable assembly, the right foldable assembly, and the truck bed.

15. The convertible rack of claim 14, further comprising:
a front panel adapted to cover a front of the covered space between the left foldable assembly, the right foldable assembly, and the base frame; and
a rear panel adapted to cover a rear of the covered space between the left foldable assembly, the right foldable assembly, and the base frame.

16. The convertible rack of claim 1, wherein, in the covered conformation, the left rack section is positioned generally perpendicular to the base of the truck bed, and wherein, in the covered conformation, the right rack section is positioned generally perpendicular to the base of the truck bed.

17. The convertible rack of claim 1, wherein, in the flat conformation, the left rack section is adapted to cover substantially half the width of the truck bed, and wherein, in the flat conformation, the right rack section is adapted to cover substantially half the width of the truck bed.

18. The convertible rack of claim 1, wherein, in the rack conformation, the left rack section is adapted to rise taller than a roof of the truck, and wherein, in the rack conformation, the right rack section is adapted to rise taller than the roof of the truck.

19. The convertible rack of claim 1, wherein the convertible rack further comprises a rack covering adapted to cover the convertible rack in the covered conformation.

20. The convertible rack of claim 19, wherein the rack covering includes:
a front panel adapted to cover a front of the convertible rack; and
a rear panel adapted to cover a rear of the convertible rack.

* * * * *